US012628174B2

(12) United States Patent
Horn et al.

(10) Patent No.: US 12,628,174 B2
(45) Date of Patent: May 12, 2026

(54) EARLY TERMINATION PREDICTOR REPORT

(71) Applicant: QUALCOMM Incorporated, San Diego, CA (US)

(72) Inventors: Idan Michael Horn, Hod Hasharon (IL); Peer Berger, Hod Hasharon (IL); Amit Bar-Or Tillinger, Tel-Aviv (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 18/398,582

(22) Filed: Dec. 28, 2023

(65) Prior Publication Data

US 2025/0220676 A1 Jul. 3, 2025

(51) Int. Cl.
*H04W 72/23* (2023.01)

(52) U.S. Cl.
CPC ................................... *H04W 72/23* (2023.01)

(58) Field of Classification Search
None
See application file for complete search history.

(56) References Cited

U.S. PATENT DOCUMENTS

2017/0366199 A1* 12/2017 Ge ......................... H03M 13/09
2018/0269899 A1* 9/2018 Noh ................... H03M 13/2906

* cited by examiner

*Primary Examiner* — Hong S Cho
(74) *Attorney, Agent, or Firm* — QUALCOMM Incorporated

(57) ABSTRACT

Methods, systems, and devices for wireless communications are described. The techniques described herein relate to an early termination predictor report. A user equipment (UE) monitors for a first downlink signal from a network entity. The UE transmits a predictor report indicative of an early decoding termination prediction accuracy associated with decoding the first downlink signal by a decoder of the UE. The UE monitors, in response to transmitting the predictor report, for a second downlink signal from the network entity, the second downlink signal based at least in part on the predictor report.

30 Claims, 14 Drawing Sheets

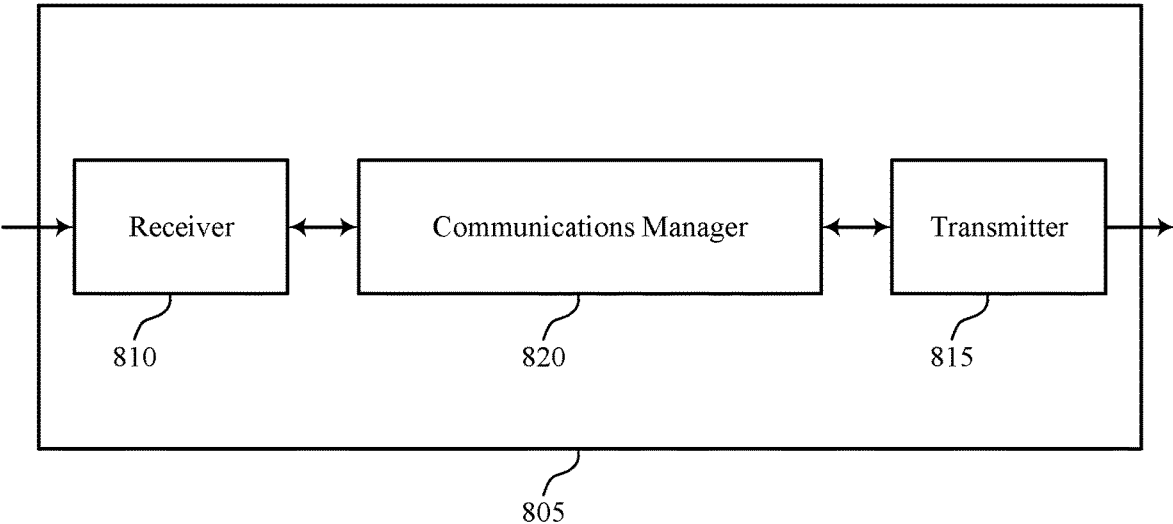
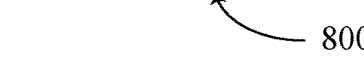
FIG. 8
800

Communications Manager

Downlink Signal Transmission
Manager

925

Predictor Report Reception
Manager

930

920

Receiver

910

Transmitter

915

905

900

130

105

115

Network
Entity

Transceiver

1110

Antenna

1115

Communications
Manager

1120

Memory

Code

1130

1125

1140

Processor

1135

1105

1100

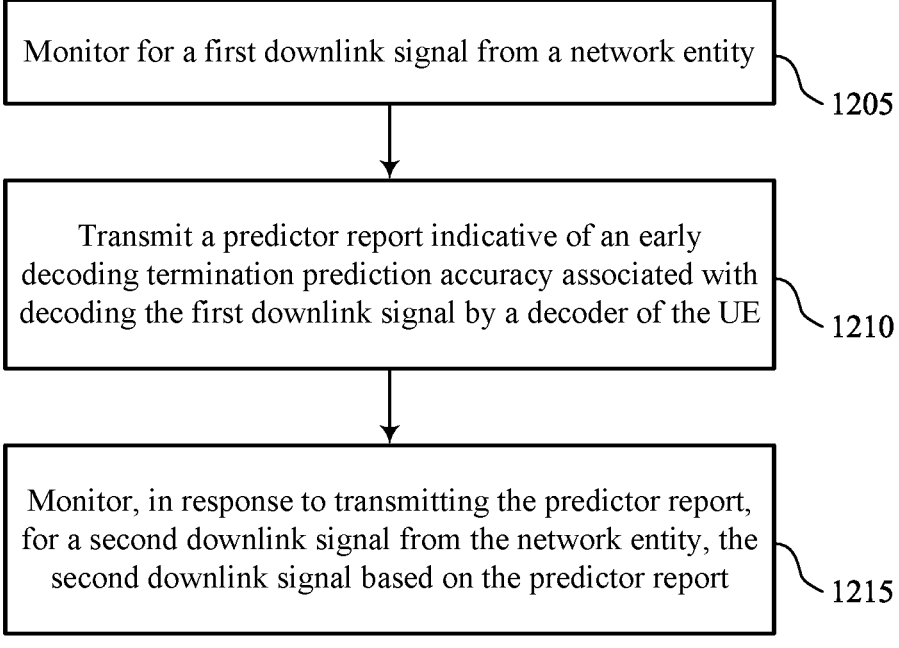

Monitor for a first downlink signal from a network entity

1205

Transmit a predictor report indicative of an early decoding termination prediction accuracy associated with decoding the first downlink signal by a decoder of the UE

1210

Monitor, in response to transmitting the predictor report, for a second downlink signal from the network entity, the second downlink signal based on the predictor report

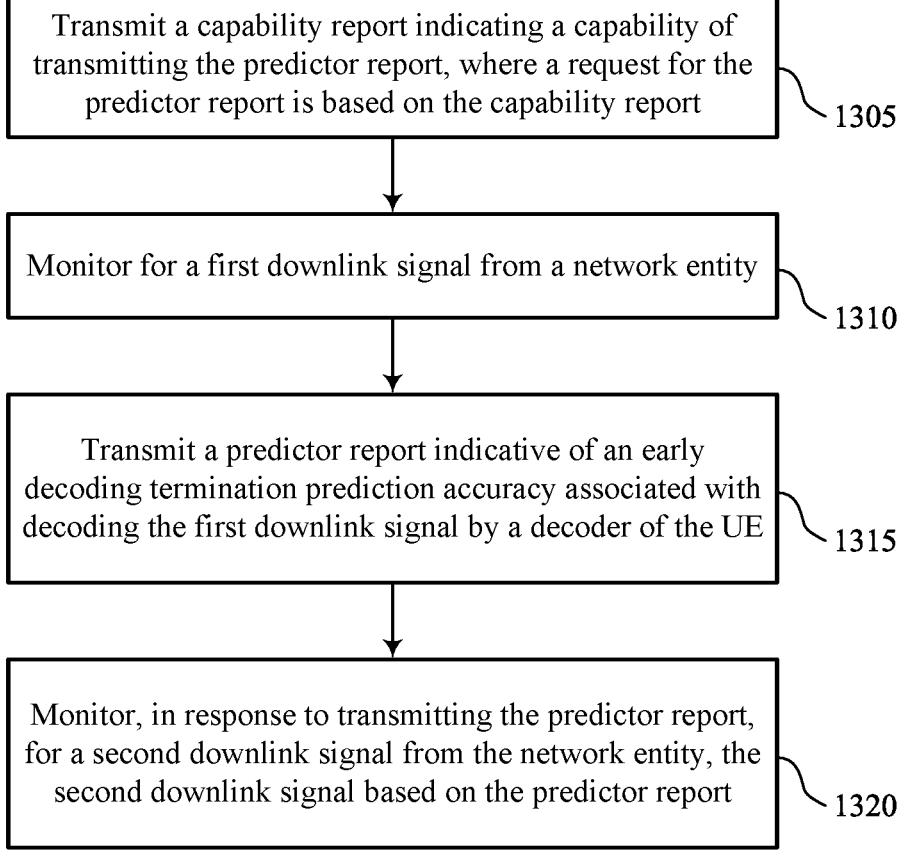

Transmit a capability report indicating a capability of transmitting the predictor report, where a request for the predictor report is based on the capability report — 1305

Monitor for a first downlink signal from a network entity — 1310

Transmit a predictor report indicative of an early decoding termination prediction accuracy associated with decoding the first downlink signal by a decoder of the UE — 1315

Monitor, in response to transmitting the predictor report, for a second downlink signal from the network entity, the second downlink signal based on the predictor report — 1320

EARLY TERMINATION PREDICTOR REPORT

FIELD OF TECHNOLOGY

The following relates to wireless communications, including an early termination predictor report.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may perform decoding operations on encoded downlink signals from the network entity to obtain information in the encoded downlink signals. In some examples, the UE may include a decoder to perform the decoding operations, and the decoder may predict decoding failures and terminate decoding operations early to reduce unnecessary utilization of computational resources of the decoder. However, in some examples, the prediction may be inaccurate, such that the decoding may have been successful and thus, was unnecessarily terminated.

SUMMARY

The described techniques relate to improved methods, systems, devices, and apparatuses that support an early termination predictor report. A user equipment (UE) may transmit a signal indicating an early termination predictor report (ETPR) to the network entity, where the ETPR indicates the accuracy of the early termination prediction. In some examples, the UE may transmit a signal indicating an ability to report the ETPR. The network entity may transmit a signal to the UE that indicates parameters for reporting the ETPR to the network entity, and the UE may estimate and send the ETPR in accordance with the parameters. The UE may transmit the signal indicating the ETPR (e.g., based on an accuracy threshold), which indicates the accuracy of the predictor or the early termination prediction. In some examples, the network entity may, in response to receiving the ETPR, optimize a power consumption and performance tradeoff at the UE, as well as signal a downlink shared channel with parameters that are updated based on the ETPR. The UE may estimate the early termination predictor accuracy again and send another ETPR when the power consumption and performance tradeoff is below a threshold tradeoff. In some examples, the UE may transmit a signal indicating a channel state feedback report, where the report indicates a configuration for the UE to optimize the accuracy of the predictor.

A method for wireless communications by a UE is described. The method may include monitoring for a first downlink signal from a network entity, transmitting a predictor report indicative of an early decoding termination prediction accuracy associated with decoding the first downlink signal by a decoder of the UE, and monitoring, in response to transmitting the predictor report, for a second downlink signal from the network entity, the second downlink signal based on the predictor report.

A UE for wireless communications is described. The UE may include one or more memories storing processor executable code, and one or more processors coupled with the one or more memories. The one or more processors may individually or collectively operable to execute the code to cause the UE to monitor for a first downlink signal from a network entity, transmit a predictor report indicative of an early decoding termination prediction accuracy associated with decoding the first downlink signal by a decoder of the UE, and monitor, in response to transmitting the predictor report, for a second downlink signal from the network entity, the second downlink signal based on the predictor report.

Another UE for wireless communications is described. The UE may include means for monitoring for a first downlink signal from a network entity, means for transmitting a predictor report indicative of an early decoding termination prediction accuracy associated with decoding the first downlink signal by a decoder of the UE, and means for monitoring, in response to transmitting the predictor report, for a second downlink signal from the network entity, the second downlink signal based on the predictor report.

A non-transitory computer-readable medium storing code for wireless communications is described. The code may include instructions executable by one or more processors to monitor for a first downlink signal from a network entity, transmit a predictor report indicative of an early decoding termination prediction accuracy associated with decoding the first downlink signal by a decoder of the UE, and monitor, in response to transmitting the predictor report, for a second downlink signal from the network entity, the second downlink signal based on the predictor report.

Some examples of the method, UEs, and non-transitory computer-readable medium described herein may further include operations, features, means, or instructions for transmitting a capability report indicating a capability of transmitting the predictor report, where a request for the predictor report may be based on the capability report.

In some examples of the method, UEs, and non-transitory computer-readable medium described herein, the early decoding termination prediction accuracy may be based on a comparison between a predicted quantity of failed code blocks and actual failed code blocks of the first downlink signal.

Some examples of the method, UEs, and non-transitory computer-readable medium described herein may further include operations, features, means, or instructions for receiving a request message indicative of a request for the predictor report, where the request message includes a channel to be estimated for the predictor report, a periodicity for the predictor report, a false alarm threshold associated with transmitting the predictor report, or any combination thereof.

In some examples of the method, UEs, and non-transitory computer-readable medium described herein, the second downlink signal may be associated with channel parameters that may be updated based on the predictor report.

Some examples of the method, UEs, and non-transitory computer-readable medium described herein may further include operations, features, means, or instructions for transmitting, in response to monitoring the second downlink signal, a request to update one or more parameters associated with the early decoding termination prediction accuracy of the decoder of the UE.

In some examples of the method, UEs, and non-transitory computer-readable medium described herein, the decoder includes a low density parity check decoder.

In some examples of the method, UEs, and non-transitory computer-readable medium described herein, the decoder includes a neural network-based predictor.

In some examples of the method, UEs, and non-transitory computer-readable medium described herein, the predictor report may be based on the early decoding termination prediction accuracy for a resource block, a scheduling block, a resource block group, a wideband frequency, a bandwidth part, a component carrier, or any combination thereof.

Some examples of the method, UEs, and non-transitory computer-readable medium described herein may further include operations, features, means, or instructions for transmitting a channel state feedback report indicative of channel state feedback and a requested configuration associated with a threshold early decoding termination prediction accuracy for the decoder.

In some examples of the method, UEs, and non-transitory computer-readable medium described herein, the requested configuration corresponds to a parameter associated with the channel state feedback.

A method for wireless communications by a network entity is described. The method may include transmitting a first downlink signal to a UE, receiving a predictor report indicative of an early decoding termination prediction accuracy associated with decoding the first downlink signal by a decoder of the UE, and transmitting, in response to receiving the predictor report, a second downlink signal.

A network entity for wireless communications is described. The network entity may include one or more memories storing processor executable code, and one or more processors coupled with the one or more memories. The one or more processors may individually or collectively operable to execute the code to cause the network entity to transmit a first downlink signal to a UE, receive a predictor report indicative of an early decoding termination prediction accuracy associated with decoding the first downlink signal by a decoder of the UE, and transmit, in response to receiving the predictor report, a second downlink signal.

Another network entity for wireless communications is described. The network entity may include means for transmitting a first downlink signal to a UE, means for receiving a predictor report indicative of an early decoding termination prediction accuracy associated with decoding the first downlink signal by a decoder of the UE, and means for transmitting, in response to receiving the predictor report, a second downlink signal.

A non-transitory computer-readable medium storing code for wireless communications is described. The code may include instructions executable by one or more processors to transmit a first downlink signal to a UE, receive a predictor report indicative of an early decoding termination prediction accuracy associated with decoding the first downlink signal by a decoder of the UE, and transmit, in response to receiving the predictor report, a second downlink signal.

Some examples of the method, network entities, and non-transitory computer-readable medium described herein may further include operations, features, means, or instructions for receiving a capability report indicating a capability of the UE to transmit the predictor report, where a request for the predictor report may be based on the capability report.

In some examples of the method, network entities, and non-transitory computer-readable medium described herein, the early decoding termination prediction accuracy may be based on a comparison between a predicted quantity of failed code blocks and actual failed code blocks of the first downlink signal.

Some examples of the method, network entities, and non-transitory computer-readable medium described herein may further include operations, features, means, or instructions for transmitting a request message indicative of a request for the predictor report, where the request message includes a channel to be estimated for the predictor report, a periodicity for the predictor report, a false alarm threshold associated with transmitting the predictor report, or any combination thereof.

In some examples of the method, network entities, and non-transitory computer-readable medium described herein, updating, based on the predictor report, channel parameters associated with the second downlink signal.

Some examples of the method, network entities, and non-transitory computer-readable medium described herein may further include operations, features, means, or instructions for receiving, in response to transmitting the second downlink signal, a request to update one or more parameters associated with the early decoding termination prediction accuracy of the decoder of the UE.

In some examples of the method, network entities, and non-transitory computer-readable medium described herein, the predictor report may be based on the early decoding termination prediction accuracy for a resource block, a scheduling block, a resource block group, a wideband frequency, a bandwidth part, a component carrier, or any combination thereof.

Some examples of the method, network entities, and non-transitory computer-readable medium described herein may further include operations, features, means, or instructions for receiving a channel state feedback report indicative of channel state feedback and a requested configuration associated with a threshold early decoding termination prediction accuracy for the decoder.

In some examples of the method, network entities, and non-transitory computer-readable medium described herein, the requested configuration corresponds to a parameter associated with the channel state feedback.

BRIEF DESCRIPTION OF THE DRAWINGS

FIGS. 8 and 9 show block diagrams of devices that support ETPR in accordance with one or more aspects of the present disclosure.

FIGS. 12 through 14 show flowcharts illustrating methods that support ETPR in accordance with one or more aspects of the present disclosure.

DETAILED DESCRIPTION

Some wireless communication systems may support an early termination procedure between a network entity and a user equipment (UE). The UE may perform decoding operations on encoded downlink signals from the network entity to obtain information in the encoded downlink signals. In some examples, the UE may include a decoder to perform the decoding operations, and the UE may indicate an early termination prediction to the network entity to reduce power consumption at the UE and/or at the network entity. For example, the decoder may predict decoding failures and terminate decoding operations early to reduce false alarm rates associated with decoding. False alarms may result in unnecessary utilization of computational resources of the decoder. However, in some examples, the prediction may be inaccurate, such that the decoding may have been successful and thus, was unnecessarily terminated.

The UE may transmit a signal indicating an early termination predictor report (ETPR) to the network entity, where the ETPR indicates the accuracy of the early termination prediction. In some examples, the UE may transmit a signal indicating an ability to report the ETPR. The network entity may transmit a signal to the UE that indicates parameters for reporting the ETPR to the network entity, and the UE may estimate and send the ETPR in accordance with the parameters. The UE may transmit the signal indicating the ETPR (e.g., based on an accuracy threshold), which indicates the accuracy of the predictor or the early termination prediction. In some examples, the network entity may, in response to receiving the ETPR, optimize a power consumption and performance tradeoff at the UE, as well as signal a downlink shared channel (e.g., a physical downlink shared channel (PDSCH)) with parameters that are updated based on the ETPR. The UE may estimate the early termination predictor accuracy again and send another ETPR when the power consumption and performance tradeoff is below a threshold tradeoff (e.g., power consumption is too high for given performance). In some examples, the UE may transmit a signal indicating a channel state feedback (CSF) report, where the report indicates a configuration for the UE to optimize the accuracy of the predictor.

Aspects of the disclosure are initially described in the context of wireless communications systems. Aspects of the disclosure are further illustrated by and described with reference to apparatus diagrams, system diagrams, and flowcharts that relate to an ETPR.

Figure 1:
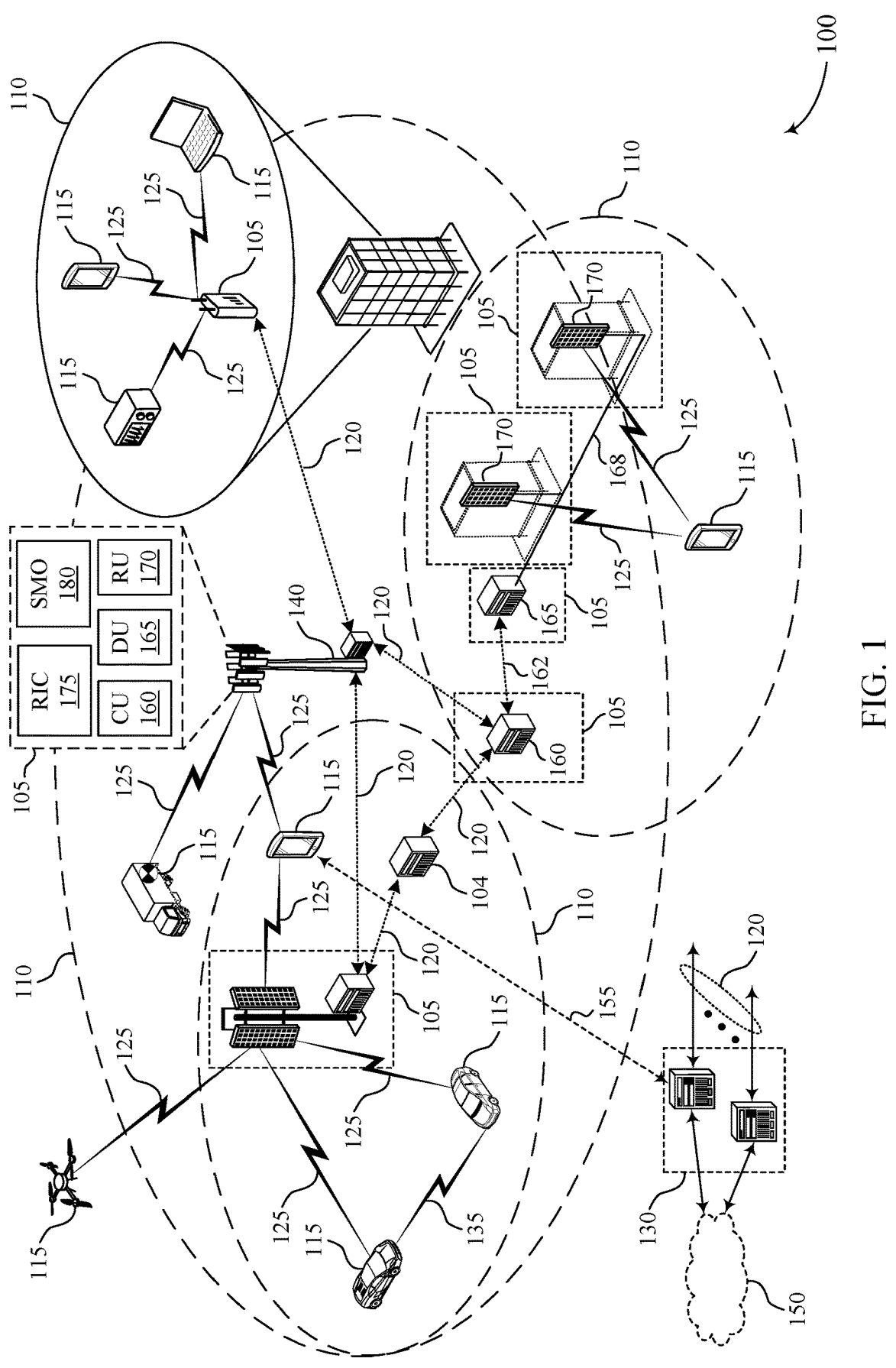
FIG. 1 shows an example of a wireless communications system that supports an early termination predictor report (ETPR) in accordance with one or more aspects of the present disclosure.

FIG. 1 shows an example of a wireless communications system 100 that supports ETPR in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support ETPR as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300

GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Additionally, in some examples, feedback may involve procedure reports, such as an ETPR. For example, some wireless communication systems may support an early termination procedure between a network entity 105 and a UE 115. The UE 115 may perform decoding operations on encoded downlink signals from the network entity 105 to obtain information in the encoded downlink signals. In some examples, the UE 115 may include a decoder to perform the decoding operations, and the UE 115 may indicate an early termination prediction to the network entity 105 to reduce power consumption at the UE 115 and/or at the network entity 105. For example, the decoder may predict decoding failures and terminate decoding operations early to reduce false alarm rates associated with decoding. False alarms may result in unnecessary utilization of computational resources of the decoder. However, in some examples, the prediction may be inaccurate, such that the decoding may have been successful and thus, was unnecessarily terminated.

As discussed herein, the UE 115 may transmit a signal indicating an ETPR to the network entity 105, where the ETPR indicates the accuracy of the early termination prediction. The ETPR may enable the network entity 105 to optimize a power consumption and performance tradeoff at the UE 115, as well as signal a downlink shared channel with parameters that are updated based on the ETPR.

In some examples, the UE 115 may transmit a signal indicating an ability to report the ETPR. The network entity 105 may transmit a signal to the UE 115 that indicates parameters for reporting the ETPR to the network entity 105, and the UE 115 may estimate and send the ETPR in accordance with the parameters. The UE 115 may transmit the signal indicating the ETPR (e.g., based on an accuracy threshold), which indicates the accuracy of the predictor or the early termination prediction. In some examples, the network entity 105 may, in response to receiving the ETPR, optimize power consumption and performance tradeoff at the UE 115. The network entity 105 may also update parameters associated with a downlink shared channel based on the ETPR to optimize power consumption and performance tradeoff for the UE 115. The UE 115 may estimate the early termination predictor accuracy again and send another ETPR when the power consumption and performance tradeoff is below a threshold tradeoff (e.g., tradeoff is below the threshold when the power consumption is too high for a given performance). In some examples, the UE 115 may transmit a signal indicating a CSF report, where the report indicates a configuration for the UE 115 to optimize the accuracy of the predictor.

Figure 2:
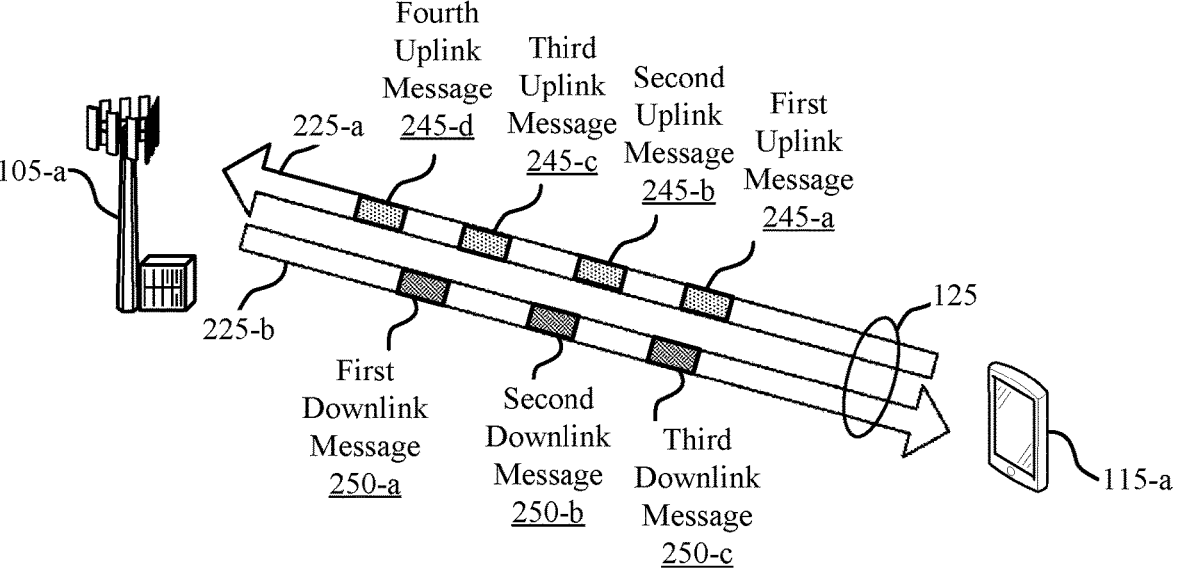
FIG. 2 shows an example of a wireless communications system that supports the ETPR in accordance with one or more aspects of the present disclosure.

FIG. 2 shows an example of a wireless communications system 200 that supports ETPR in accordance with one or more aspects of the present disclosure. The wireless communications system 200 may implement aspects of or may be implemented by aspects of the wireless communications system 100. For example, the wireless communications system 200 includes a UE 115-a and a network entity 105-a, which may be examples of a UE 115 and a network entity 105 described with respect to FIG. 1. Although the following discussions describe the network entity 105-a as optimizing UE power consumption, for example, by determining and modifying PDSCH parameters, the techniques described herein may apply to the UE 115-a optimizing UE power consumption. For example, the CSF report from the UE 115-a to the network entity 105-a may include a requested configuration that may increase predictor accuracy of the decoder for improving UE power consumption.

In some wireless communications systems, such as wireless communications systems associated with 5G new radio (NR) and sub-terahertz (sub-THz) frequencies (e.g., frequency range 4 (FR4), frequency range 5 (FR5), etc.), the UE 115-a may benefit from reduced power consumption. The UE 115-a in such systems may include a low density parity check (LDPC) decoder, which is one of the main power consuming modules in current 5G NR baseband receivers. Power consumption at the decoder may increase, for example, as bandwidth increases. Bandwidth may increase to include more resources for accommodating increased data rates (e.g., FR4, FR5, 6G bands, etc.). The relationship between power consumption of the LDPC decoder and the quantity of decoding iterations may be linear (e.g., a greater quantity of decoding iterations corresponds to greater power consumption at the UE 115-a). Unsuccessfully decoded code blocks may consume more power than successfully decoded code blocks since unsuccessfully decoded code blocks may involve multiple iterations of decoding in attempts to successfully decode (e.g., largest quantity of iterations). Successfully decoded codes may correspond to relatively fewer iterations, in average, for decoding.

In examples where a high quantity of retransmissions is targeted, such as in a multiple incremental retransmission system (MIRS), the rate of unsuccessfully decoded code blocks may be high and thus, the power consumption of the LDPC decoder may be correspondingly high. As discussed herein, an ETPR may indicate to the network entity 105-a, the predictor quality of a predictor of the UE 115-a. The network entity 105-a may reduce (e.g., optimize) the UE power consumption based on the ETPR along with measured or reported channel conditions, signal to noise ratio (SNR), precoding, and so forth. In some examples, the UE 115-a may include a requested configuration in a CSF report to increase predictor accuracy (e.g., highest accuracy) for improving power consumption at the UE 115-a. For example, the CSF report from the UE may include optimized rank indicator (RI), channel quality indicator (CQI), and/or precoding matrix indicator (PMI) that is dedicated for ETPR.

In some examples, the ETPR may indicate the accuracy of the predictor of the UE 115-a for a UE power reduction by the network entity 105-a. An ETPR may efficiently facilitate a reduction in UE power consumption. Increasing accuracy of the UE estimator or predictor may be important in a multiple retransmission environment, such as in a MIRS framework, NB-IoT, and so forth. The ETPR discussed herein may be used by the network entity 105-a to update PDSCH physical layer parameters, such that the UE power consumption and performance tradeoff may be decreased.

An early termination predictor may include a simplified success predictor, which uses a mean (e.g., average) of log-likelihood ratios (LLRs) of mutual information (MI). Graphical representations, such as histograms, may be used for generating LLR histograms corresponding to LDPC success prediction. The histograms may provide more information than the average MI of the LLRs, and this information may be used by the UE 115-a to better predict whether a code block is likely to pass a cyclic redundancy check (CRC) (e.g., an error-detecting code) or not likely to pass.

The UE 115-a may include a neural network-based predictor. A neural network-based predictor may be used for LDPC successful decoding. The neural network-based predictor may use a network input, which may include features of a code block, such as M bins of the histogram of the code block received LLRs, where M includes a quantity of bins (absolute values). In such examples, the histogram bins may be linearly spaced in an LLR domain and/or in an MI domain. In some examples, the network input may include average MI of the code block received LLRs. The average MI feature may be redundant in examples where a high resolution histogram is used, and the neural network-based predictor may classify each code block to a "pass" class or a "fail" class.

In some examples, performance of the neural network-based predictor, which may be trained per SNR, may be measured by a common misdetection rate and a false alarm rate of multiple predictor solutions. Different code rates (e.g., misdetection rates) may determine different false alarm probability, such as target misdetection rate of 0.1% or 1.0%. The results of the different ETPR solutions (e.g., different code rates) may indicate that in order to reduce UE power consumption, the false alarm predictions from the predictor may be below a respective false alarm prediction threshold for the rate (e.g., false alarms should remain below the false alarm threshold to provide intended power consumption). The network entity 105-a may change the PDSCH modulation and coding scheme (MCS) according to the ETPR report to reduce UE power consumption.

In the wireless communications system 200, the UE 115-a may transmit the ETPR to the network entity 105-a. For example, the network entity 105-a may communicate with the UE 115-a using a communication link 125. In some examples, the communication link 125 may include a first channel 225-a for transmitting data from the UE 115-a to the network entity 105-a and a second channel 225-b for transmitting data from the network entity 105-a to the UE 115-a. The communication link 125 may be an example of an NR or LTE link between the UE 115-a and the network entity 105-a. The communication link 125 may include a bidirectional link that enables both uplink and downlink communications, for example, via the channels 225. For example, the UE 115-a may transmit uplink messages 245 (e.g., uplink transmissions), such as uplink control signals or uplink data signals, to the network entity 105-a using the first channel 225-a (e.g., of the communication link 125) and the network entity 105-a may transmit downlink messages 250 (e.g., downlink transmissions), such as downlink control signals or downlink data signals, to the UE 115-a using the second channel 225-b (e.g., of the communication link 125). In some examples, the downlink messages 250 (e.g., a first downlink message 250-a, the second downlink message 250-b, and the third downlink message 250-c) may be part of control signaling transmitted from the network entity 105-a.

UE 115-a may transmit a first uplink message 245-a to the network entity 105-a, where the first uplink message 245-a may include a capability report indicating a capability of transmitting ETPR (e.g., predictor report). The network entity 105-a may transmit a first downlink message 250-a, which may include a request message indicative of a request for the ETPR, for example, based on receiving the capability report. The request message may include a channel to be estimated for the ETPR, a periodicity for the ETPR, a false alarm threshold associated with transmitting the ETPR, or any combination thereof.

The UE 115-a may monitor for a second downlink message 250-b from the network entity 105-a, where the second downlink message 250-b includes code blocks. The early decoding termination prediction accuracy provided in the ETPR may be based on a comparison between a predicted quantity of failed code blocks and actual failed code blocks of the second downlink message 250-b. The UE 115-a may transmit a second uplink message 245-b, which includes the ETPR. The ETPR may be indicative of an early decoding termination prediction accuracy associated with decoding the second downlink message 250-b by a decoder of the UE 115-a.

The network entity 105-b may transmit a third downlink message 250-c, which may be based on the ETPR. The third downlink message 250-c may be associated with channel parameters that are updated based on the ETPR. In some examples, the UE 115-a may transmit, in response to monitoring the third downlink message 250-c, a third uplink message 245-c. The third uplink message 245-c may include a request to update one or more parameters associated with the early decoding termination prediction accuracy of the decoder of the UE 115-a. In some examples, the decoder may include a LDPC decoder. In some examples, the decoder may include a neural network-based predictor. The ETPR may be based on the early decoding termination prediction accuracy for a resource block (RB), a scheduling block (SB), a resource block group (RBG), a wideband (WB) frequency, a bandwidth part (BWP), a component carrier (CC), or any combination thereof. In some examples, the UE 115-a may transmit a fourth uplink message 245-d, which includes a CSF report. The CSF report may be indicative of CSF and a requested configuration associated with a threshold early decoding termination prediction accuracy for the decoder. The requested configuration may correspond to a parameter associated with the CSF.

Figure 3:
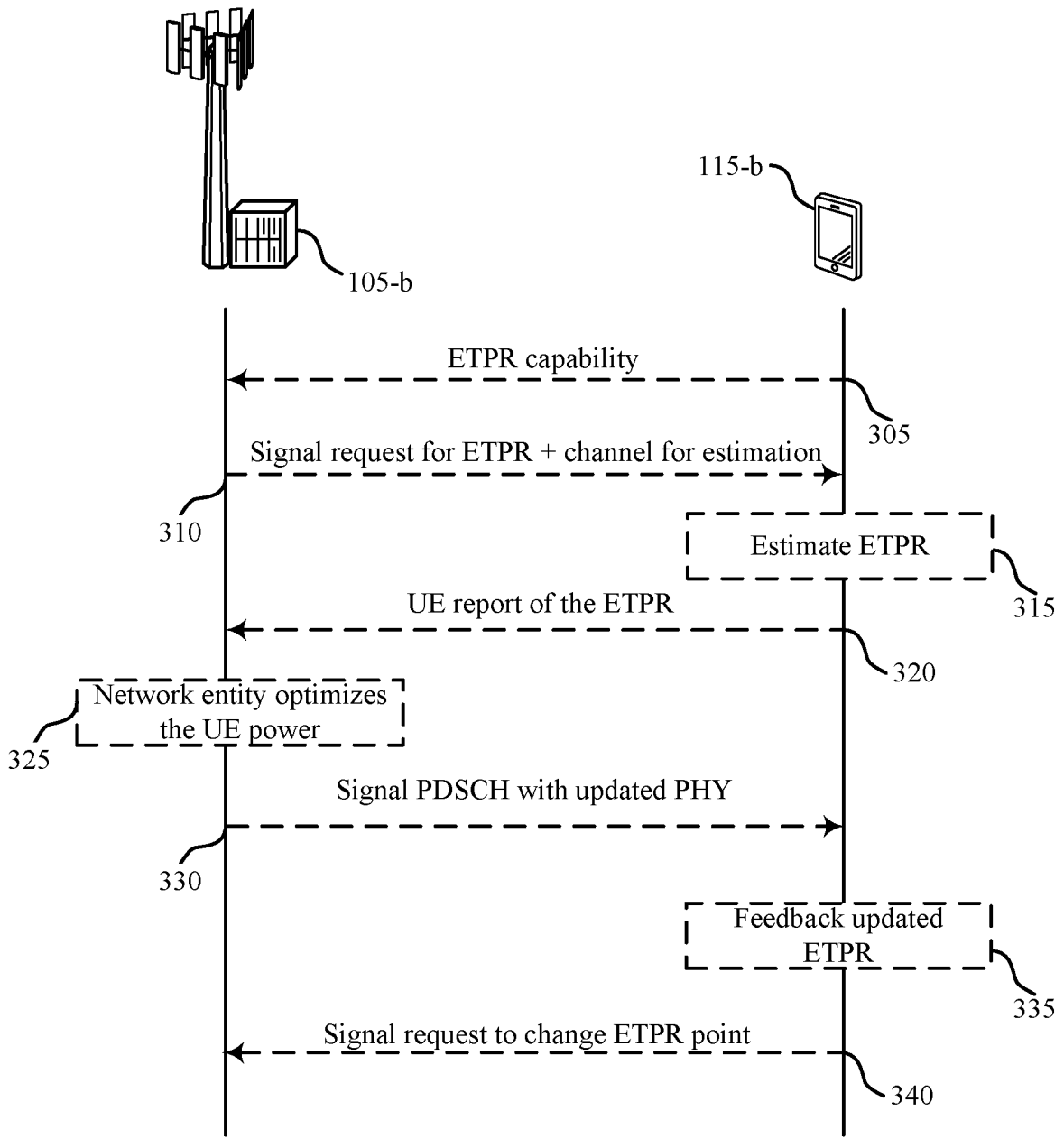
FIG. 3 shows an example of a process flow that supports the ETPR in accordance with one or more aspects of the present disclosure.

FIG. 3 shows an example of a process flow 300 that supports ETPR in accordance with one or more aspects of the present disclosure. The process flow 300 may implement aspects of or may be implemented by aspects of the wireless communications system 100 or the wireless communications system 200. For example, the process flow 300 may include a UE 115-*b* and a network entity 105-*b*, which may be an example of a UE 115 and a network entity 105 as described herein. In the following description of the process flow 300, the operations performed by the UE 115-*b* and the network entity 105-*b* may be performed in different orders or at different times than the exemplary order shown. Some operations may also be omitted from the process flow 300, or other operations may be added to the process flow 300. Further, while operations in the process flow 300 are illustrated as being performed by the UE 115-*b* and the network entity 105-*b*, the examples herein are not to be construed as limiting, as the described features may be associated with any quantity of different devices.

At 305, once the UE 115-*b* establishes connection with the network entity 105-*b*, the UE 115-*b* may transmit signaling (e.g., a message) indicating a capability to report early termination prediction accuracy in the ETPR. The ETPR may indicate the channels that may be used for providing the prediction, such as PDSCH data, physical downlink control channel (PDCCH) control data, pilot channels (e.g., demodulation reference signal (DMRS), a channel state information reference signal (CSI-RS), a synchronization signal block (SSB), etc.) based on data generated or measured by the UE 115-*b* (e.g., based on self-generated data). The UE 115-*b* may indicate the intended or requested statistics for the estimator of the UE 115-*b* (e.g., minimal quantity of code blocks, slots, DMRS, and so forth).

In some examples, the UE 115-*b* may specify whether or not the UE 115-*b* may extrapolate or apply the false alarm estimation from one channel to another channel, such as a PDCCH estimation to be extrapolated to PDSCH channel. The UE 115-*b* may report the intended false alarm working point, which may provide the lowest power consumption used in providing the greatest performance (e.g., optimal power-to-performance tradeoff). This ETPR may be generated without prior information, such as without a predetermined or predefined efficiency (e.g., working point) or based on a periodic or aperiodic ETPR. The periodicity may be based on channel conditions, such as SINR. In some examples, upon establishing the connection with the network entity 105-*b*, the UE 115-*b* may report expected false alarms with respect to multiple missed detections (e.g., full curve) so that the network entity 105-*b* may reduce the periodicity of reporting the ETPR. Reducing reporting of the ETPR may reduce overhead. In some examples, the capability of reporting the ETPR may be predefined in the standard under MIRS category support.

At 310, the network entity 105-*b* may transmit signaling to the UE 115-*b* indicating a request for ETPR reporting and associated parameters. For example, the signaling may indicate the channel to be used for the estimation, as well as the channel to be used for extrapolation if extrapolation to another channel is appropriate. The signaling may indicate the periodicity of the report. In some examples, the periodicity may be based on the CSF periodicity, for example, in addition to a configured predetermined periodicity. The network entity 105-*b* may signal a reporting threshold for the UE 115-*b*, where the reporting threshold indicates whether the false alarm prediction is above the false alarm threshold or below the false alarm threshold. In some examples, the UE 115-*b* may send the ETPR to the network entity 105-*b* regardless of a threshold. The ETPR may have a size of 1 bit.

At 315, UE 115-*b* may estimate the ETPR according to the configurations received from the network entity 105-*b* (e.g., at 310). The UE 115-*b* may use a complex predictor (e.g., high-end predictor indicating multiple and/or complex statistics) or a simpler predictor (e.g., indicating averaged MI) according to the channel conditions and power consumption.

The UE 115-*b* may estimate the false alarm accuracy of the predictor of the UE 115-*b* by analyzing and indicating collection of failed code blocks that were predicted to be passing code blocks (e.g., failed code blocks were mapped to passing code blocks) in the predictor and compare it to the quantity of code blocks that failed that were predicted to be failed code blocks by the predictor. The UE 115-*b* may apply the potential code blocks in the decoder to verify that the predicted to fail code blocks actually fail and are not considered a missed detection.

At 320, the UE 115-*b* may transmit signaling reporting the ETPR to the network entity 105-*b* according to the configurations provided by the network entity 105-*b*. The ETPR may indicate the accuracy of the false alarm predictor, and the ETPR may be signaled in a linear or logarithmic percentage quantized to nonuniform false alarms according to prior information (e.g., a-priori) or network entity 105-*b* configuration. In some examples, the ETPR may be transmitted in a 1 bit format, indicating if the estimation is greater than the false alarm probability threshold or below the threshold. In some examples, the ETPR report may be signaled to the network entity 105-*b* based on a CSF report, such that the UE 115-*b* may indicate the differentiation from the reported MCS, PMI, RI that increases performance at the UE 115-*b*. For example, UE 115-*b* can indicate that decreasing the MCS by 1 may result in relatively lower power consumption at the UE 115-*b* (e.g., low power consumption mode) and/or an indication of the performance tradeoff. In some examples, the UE 115-*b* may signal a requested PMI that may reduce the false alarm probability. The information in the ETPR may be based on frequency granularity (e.g., per RB, SB, RBG, WB, BWP, CC, etc.).

At 325, the network entity 105-*b* may reduce the UE power consumption and performance tradeoff based on the ETPR by updating communication parameters, such as the PDSCH physical (PHY) parameters. In some examples, the MCS or RI may be adjusted, such as by increasing or decreasing the parameters. In some examples, adjusting parameters may include changing the retransmission method, such as from MIRS to incremental redundancy as the NR standard. The allocation size and location in the frequency domain may also be changed based on the ETPR report. Precoding may be changed to improve the ETPR performance. In some examples, multiple level coding (MLC) or other coding schemes may be used to change the predictor accuracy.

At 330, the network entity 105-*b* may transmit signaling indicating the PDSCH with the updated parameters (e.g., at 325), for example, by additional signaling of the updated PHY parameters based on downlink control information (DCI) or a MAC control element (CE). In some examples, the parameters that may be adjusted may include parameters related to resource allocation in time domain and acknowledgement or negative acknowledgement (ACK/NACK) responses, such as K0, K1, K2, SLIV, N1, N2. For example, the K0 may be greater than 0 (K0>0), where K0 indicates the quantity of time slots between PDCCH or DCI and downlink data (e.g., PDSCH) transmission (e.g., so DCI and PDSCH are not in the same slot when K0>0). The network entity 105-*b* may use the MIRS according to the UE false alarm predictor capabilities.

At 335, the UE 115-*b* may estimate the ETPR accuracy again and verify improvements, such as by verifying that the ETPR accuracy (e.g., predictor accuracy) is within the working point or below a threshold. At 340, the UE 115-*b* may transmit signaling indicating a report to the network entity 105-*b*. The report may indicate that the present working point results in a power consumption above a threshold (e.g., reduced performance tradeoff). In some examples, the accuracy of the predicator may influence or impact usage of CRC (e.g., quantity of CRC iterations), as well as impact the CRC false alarm probability (e.g., the probability that an incorrect word yields an indication of a correct CRC). The impact of the accuracy of the predictor may further impact MIRS, which involves retransmissions (e.g., more CRC failures). Using the ETPR described herein, the network entity 105-*b* may be aware of the false alarms and use the reported information to reduce the CRC size accordingly, to save overhead.

Figure 4:
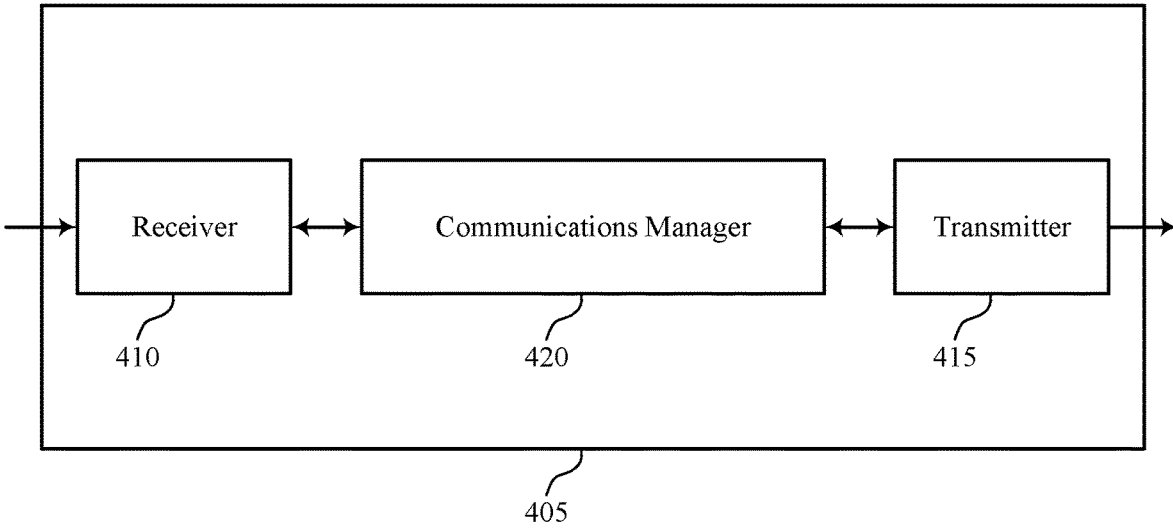
FIGS. 4 and 5 show block diagrams of devices that support the ETPR in accordance with one or more aspects of the present disclosure.

FIG. 4 shows a block diagram 400 of a device 405 that supports ETPR in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to ETPR). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to ETPR). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of ETPR as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for monitoring for a first downlink signal from a network entity. The communications manager 420 is capable of, configured to, or operable to support a means for transmitting a predictor report indicative of an early decoding termination prediction accuracy associated with decoding the first downlink signal by a decoder of the UE. The communications manager 420 is capable of, configured to, or operable to support a means for monitoring, in response to transmitting the predictor report, for a second downlink signal from the network entity, the second downlink signal based on the predictor report.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reducing power consumption and increasing performance at the UE based on an ETPR that indicates accuracy of an early termination predictor.

Figure 5:
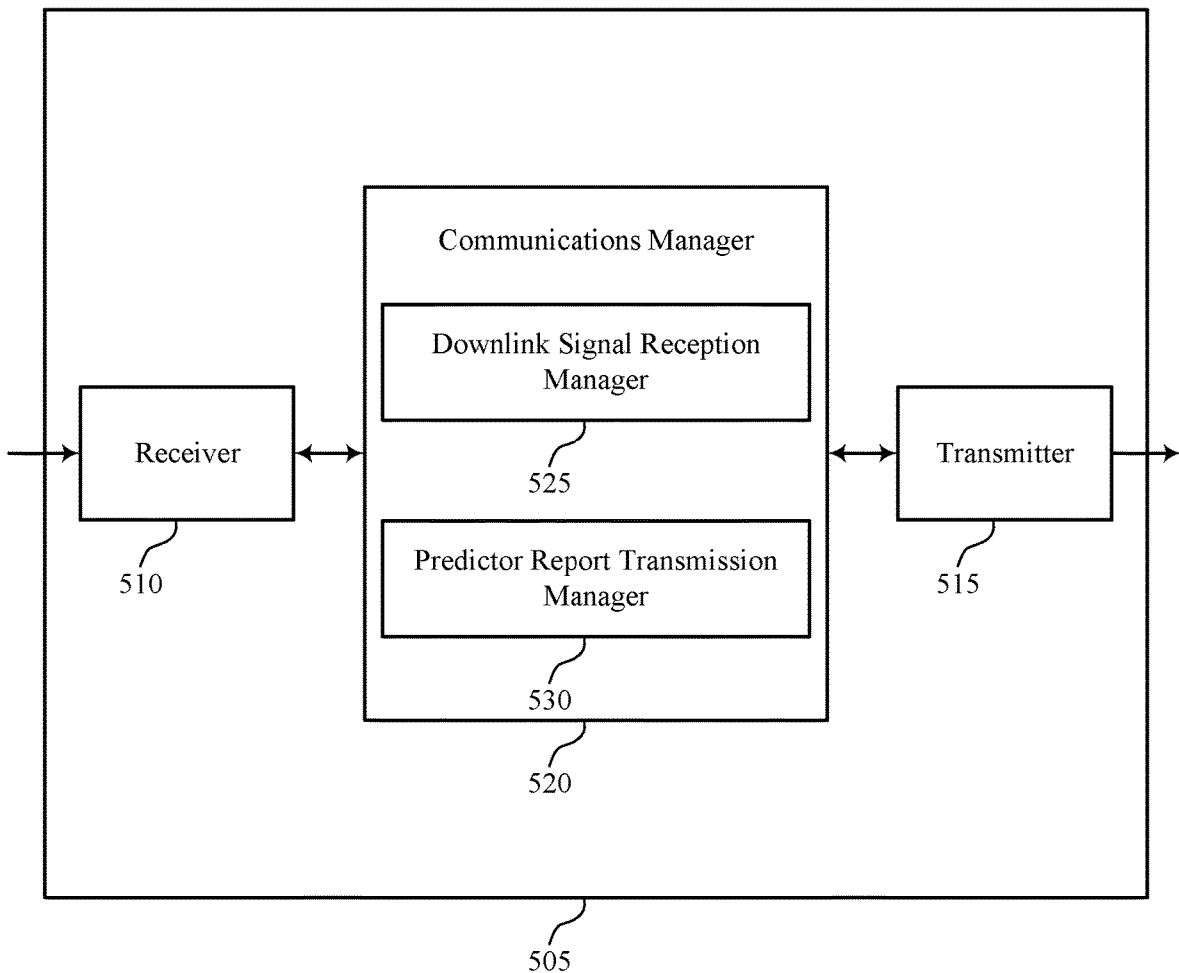

FIG. 5 shows a block diagram 500 of a device 505 that supports ETPR in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to ETPR). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to ETPR). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of ETPR as described herein. For example, the communications manager 520 may include a downlink signal reception manager 525 a predictor report transmission manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The downlink signal reception manager 525 is capable of, configured to, or operable to support a means for monitoring for a first downlink signal from a network entity. The predictor report transmission manager 530 is capable of, configured to, or operable to support a means for transmitting a predictor report indicative of an early decoding termination prediction accuracy associated with decoding the first downlink signal by a decoder of the UE. The downlink signal reception manager 525 is capable of, configured to, or operable to support a means for monitoring, in response to transmitting the predictor report, for a second downlink signal from the network entity, the second downlink signal based on the predictor report.

Figure 6:
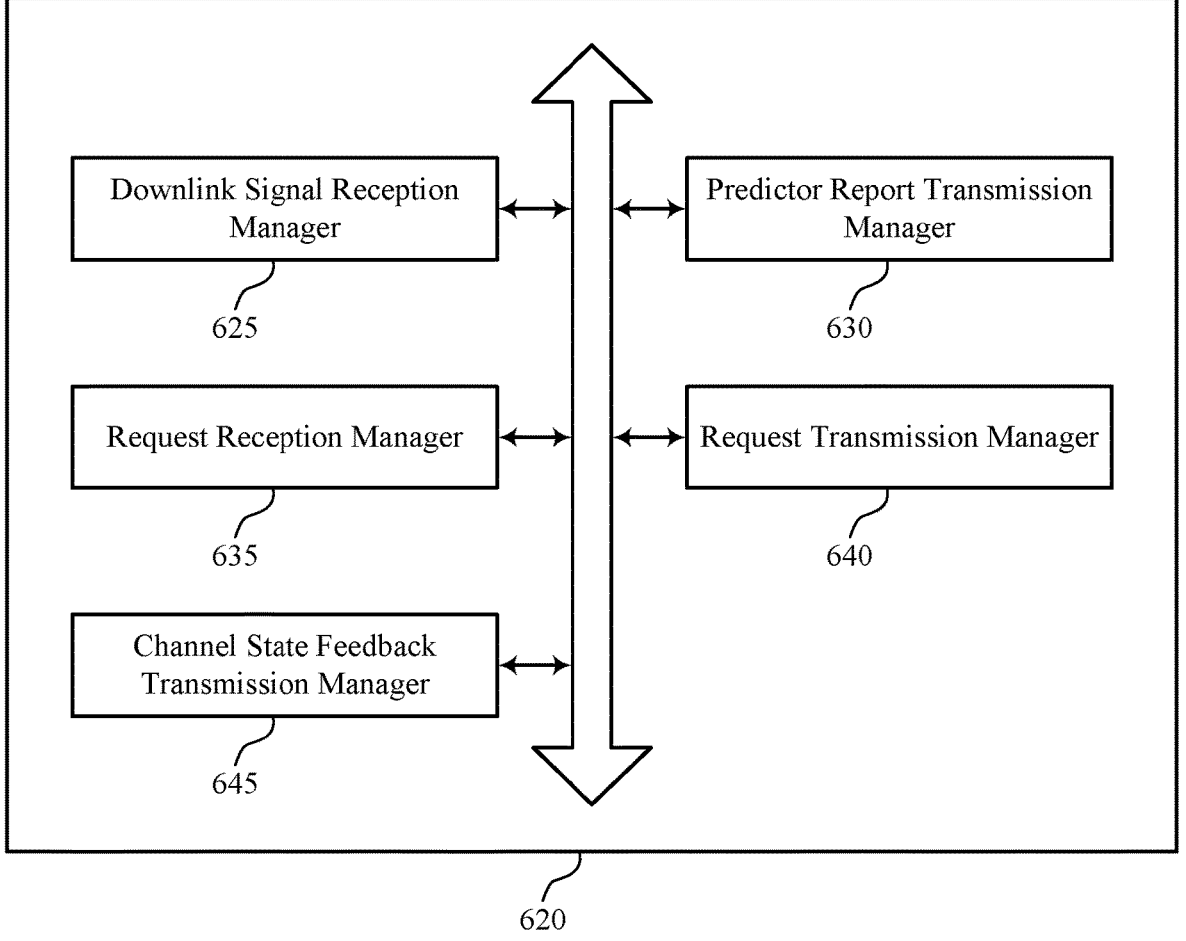
FIG. 6 shows a block diagram of a communications manager that supports ETPR in accordance with one or more aspects of the present disclosure.

FIG. 6 shows a block diagram 600 of a communications manager 620 that supports ETPR in accordance with one or more aspects of the present disclosure. The communications manager 620 may be an example of aspects of a communications manager 420, a communications manager 520, or both, as described herein. The communications manager 620, or various components thereof, may be an example of means for performing various aspects of ETPR as described herein. For example, the communications manager 620 may include a downlink signal reception manager 625, a predictor report transmission manager 630, a request reception manager 635, a request transmission manager 640, a channel state feedback transmission manager 645, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The downlink signal reception manager 625 is capable of, configured to, or operable to support a means for monitoring for a first downlink signal from a network entity. The predictor report transmission manager 630 is capable of, configured to, or operable to support a means for transmitting a predictor report indicative of an early decoding termination prediction accuracy associated with decoding the first downlink signal by a decoder of the UE. In some examples, the downlink signal reception manager 625 is capable of, configured to, or operable to support a means for monitoring, in response to transmitting the predictor report, for a second downlink signal from the network entity, the second downlink signal based on the predictor report.

In some examples, the predictor report transmission manager 630 is capable of, configured to, or operable to support a means for transmitting a capability report indicating a capability of transmitting the predictor report, where a request for the predictor report is based on the capability report.

In some examples, the early decoding termination prediction accuracy is based on a comparison between a predicted quantity of failed code blocks and actual failed code blocks of the first downlink signal.

In some examples, the request reception manager 635 is capable of, configured to, or operable to support a means for receiving a request message indicative of a request for the predictor report, where the request message includes a channel to be estimated for the predictor report, a periodicity for the predictor report, a false alarm threshold associated with transmitting the predictor report, or any combination thereof.

In some examples, the second downlink signal is associated with channel parameters that are updated based on the predictor report.

In some examples, the request transmission manager 640 is capable of, configured to, or operable to support a means for transmitting, in response to monitoring the second downlink signal, a request to update one or more parameters associated with the early decoding termination prediction accuracy of the decoder of the UE.

In some examples, the decoder includes a low density parity check decoder.

In some examples, the decoder includes a neural network-based predictor.

In some examples, the predictor report is based on the early decoding termination prediction accuracy for a resource block, a scheduling block, a resource block group, a wideband frequency, a bandwidth part, a component carrier, or any combination thereof.

In some examples, the channel state feedback transmission manager 645 is capable of, configured to, or operable to support a means for transmitting a channel state feedback report indicative of channel state feedback and a requested configuration associated with a threshold early decoding termination prediction accuracy for the decoder.

In some examples, the requested configuration corresponds to a parameter associated with the channel state feedback.

Figure 7:
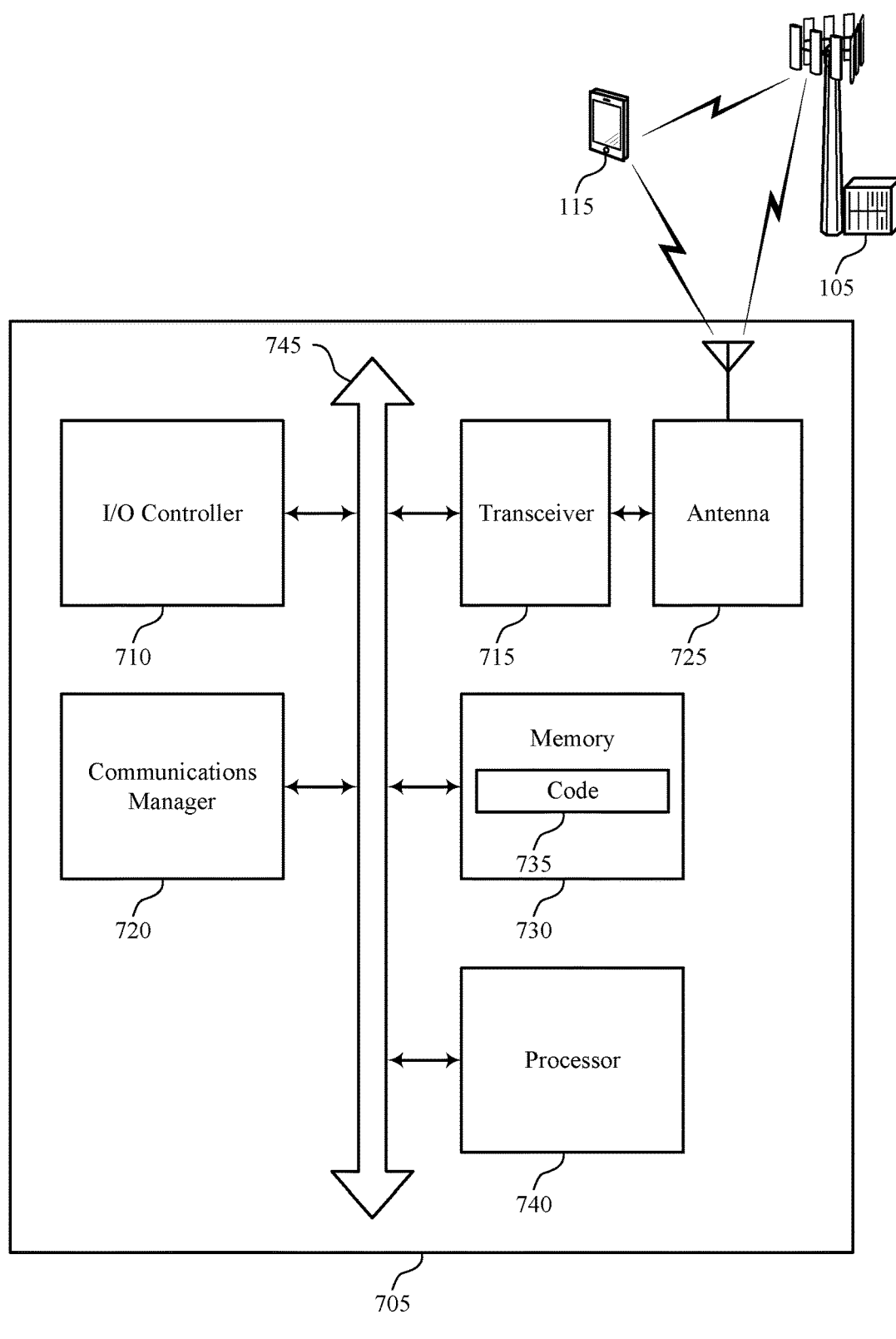
FIG. 7 shows a diagram of a system including a device that supports ETPR in accordance with one or more aspects of the present disclosure.

FIG. 7 shows a diagram of a system 700 including a device 705 that supports ETPR in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting ETPR). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for monitoring for a first downlink signal from a network entity. The communications manager 720 is capable of, configured to, or operable to support a means for transmitting a predictor report indicative of an early decoding termination prediction accuracy associated with decoding the first downlink signal by a decoder of the UE. The communications manager 720 is capable of, configured to, or operable to support a means for monitoring, in response to transmitting the predictor report, for a second downlink signal from the network entity, the second downlink signal based on the predictor report.

By including or configuring the communications manager 720 in accordance with examples as described herein, the device 705 may support techniques for reducing power consumption and increasing performance at the UE based on an ETPR that indicates accuracy of an early termination predictor.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of ETPR as described herein, or the at least one processor 740 and the at least one memory 730 may be otherwise configured to, individually or collectively, perform or support such operations.

FIG. 8 shows a block diagram 800 of a device 805 that supports ETPR in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of ETPR as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting a first downlink signal to a UE. The communications manager 820 is capable of, configured to, or operable to support a means for receiving a predictor report indicative of an early decoding termination prediction accuracy associated with decoding the first downlink signal by a decoder of the UE. The communications manager 820 is capable of, configured to, or operable to support a means for transmitting, in response to receiving the predictor report, a second downlink signal.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reducing power consumption and increasing performance at the UE based on an ETPR that indicates accuracy of an early termination predictor.

Figure 9:
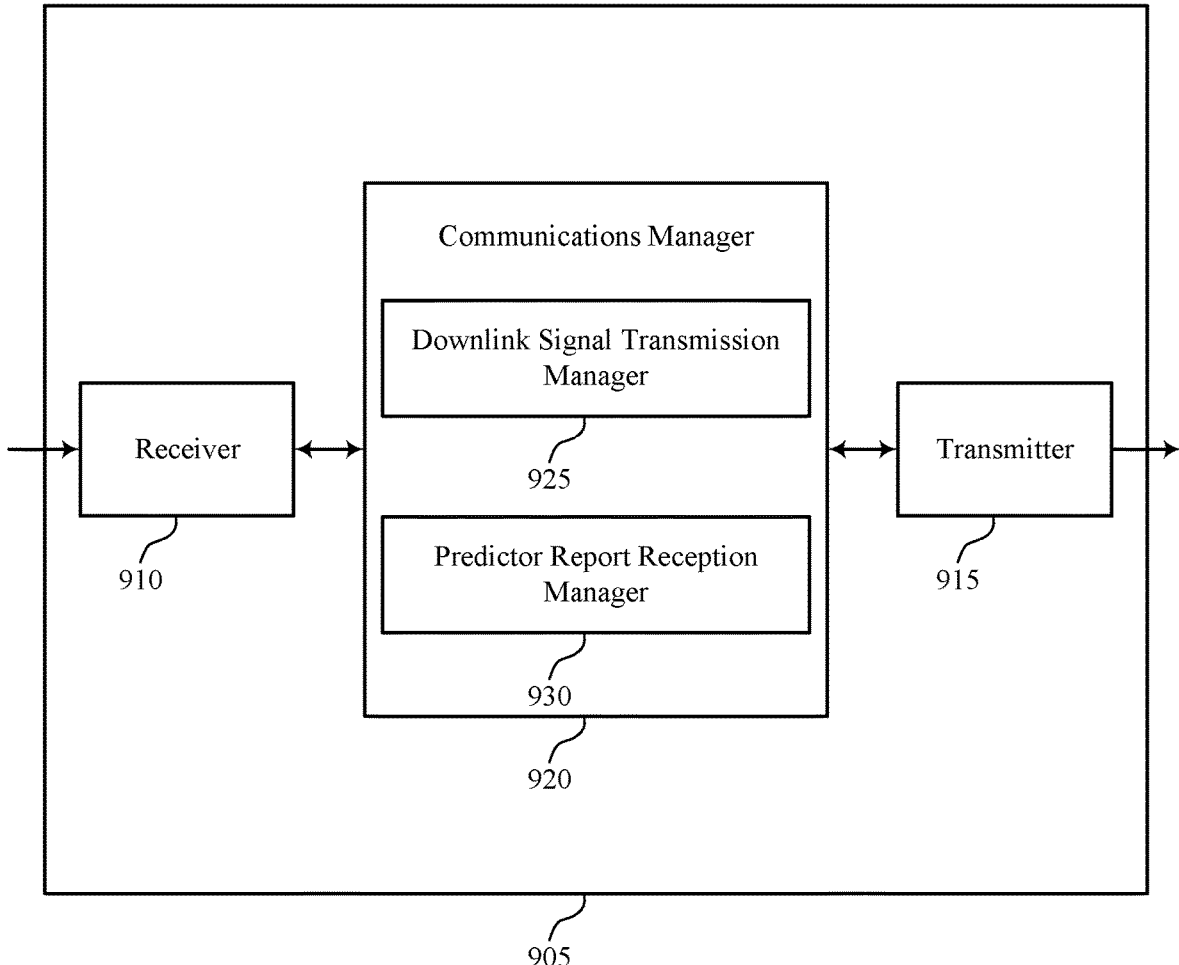

FIG. 9 shows a block diagram 900 of a device 905 that supports ETPR in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of ETPR as described herein. For example, the communications manager 920 may include a downlink signal transmission manager 925 a predictor report reception manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The downlink signal transmission manager 925 is capable of, configured to, or operable to support a means for transmitting a first downlink signal to a UE. The predictor report reception manager 930 is capable of, configured to, or operable to support a means for receiving a predictor report indicative of an early decoding termination prediction accuracy associated with decoding the first downlink signal by a decoder of the UE. The downlink signal transmission manager 925 is capable of, configured to, or operable to support a means for transmitting, in response to receiving the predictor report, a second downlink signal.

Figure 10:
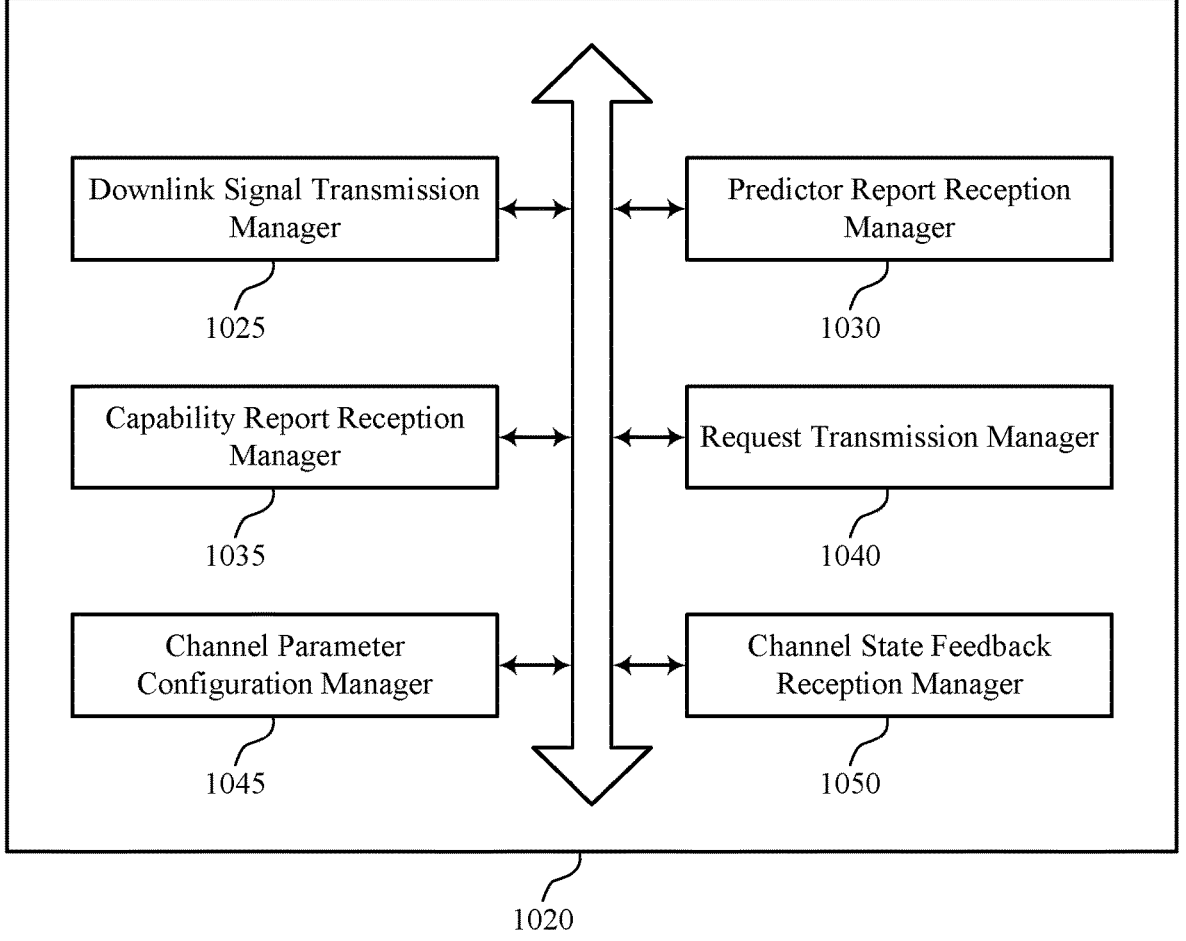
FIG. 10 shows a block diagram of a communications manager that supports ETPR in accordance with one or more aspects of the present disclosure.

FIG. 10 shows a block diagram 1000 of a communications manager 1020 that supports ETPR in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of ETPR as described herein. For example, the communications manager 1020 may include a downlink signal transmission manager 1025, a predictor report reception manager 1030, a capability report reception manager 1035, a request transmission manager 1040, a channel parameter configuration manager 1045, a channel state feedback reception manager 1050, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The downlink signal transmission manager 1025 is capable of, configured to, or operable to support a means for transmitting a first downlink signal to a UE. The predictor report reception manager 1030 is capable of, configured to, or operable to support a means for receiving a predictor report indicative of an early decoding termination prediction accuracy associated with decoding the first downlink signal by a decoder of the UE. In some examples, the downlink signal transmission manager 1025 is capable of, configured to, or operable to support a means for transmitting, in response to receiving the predictor report, a second downlink signal.

In some examples, the capability report reception manager 1035 is capable of, configured to, or operable to support a means for receiving a capability report indicating a capability of the UE to transmit the predictor report, where a request for the predictor report is based on the capability report.

In some examples, the early decoding termination prediction accuracy is based on a comparison between a predicted quantity of failed code blocks and actual failed code blocks of the first downlink signal.

In some examples, the request transmission manager 1040 is capable of, configured to, or operable to support a means for transmitting a request message indicative of a request for the predictor report, where the request message includes a channel to be estimated for the predictor report, a periodicity for the predictor report, a false alarm threshold associated with transmitting the predictor report, or any combination thereof.

In some examples, the channel parameter configuration manager 1045 is capable of, configured to, or operable to support a means for updating, based on the predictor report, channel parameters associated with the second downlink signal.

In some examples, the channel parameter configuration manager 1045 is capable of, configured to, or operable to support a means for receiving, in response to transmitting the second downlink signal, a request to update one or more parameters associated with the early decoding termination prediction accuracy of the decoder of the UE.

In some examples, the predictor report is based on the early decoding termination prediction accuracy for a resource block, a scheduling block, a resource block group, a wideband frequency, a bandwidth part, a component carrier, or any combination thereof.

In some examples, the channel state feedback reception manager 1050 is capable of, configured to, or operable to support a means for receiving a channel state feedback report indicative of channel state feedback and a requested configuration associated with a threshold early decoding termination prediction accuracy for the decoder.

In some examples, the requested configuration corresponds to a parameter associated with the channel state feedback.

Figure 11:
FIG. 11 shows a diagram of a system including a device that supports ETPR in accordance with one or more aspects of the present disclosure.

FIG. 11 shows a diagram of a system 1100 including a device 1105 that supports ETPR in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting ETPR). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting a first downlink signal to a UE. The communications manager 1120 is capable of, configured to, or operable to support a means for receiving a predictor report indicative of an early decoding termination prediction accuracy associated with decoding the first downlink signal by a decoder of the UE. The communications manager 1120 is capable of, configured to, or operable to support a means for transmitting, in response to receiving the predictor report, a second downlink signal.

By including or configuring the communications manager 1120 in accordance with examples as described herein, the device 1105 may support techniques for reducing power consumption and increasing performance at the UE based on an ETPR that indicates accuracy of an early termination predictor.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of ETPR as described herein, or the at least one processor 1135 and the at least one memory 1125 may be otherwise configured to, individually or collectively, perform or support such operations.

FIG. 12 shows a flowchart illustrating a method 1200 that supports ETPR in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include monitoring for a first downlink signal from a network entity. The operations of block 1205 may be performed in accordance with examples as disclosed herein. In some examples, aspects of the operations of 1205 may be performed by a downlink signal reception manager 625 as described with reference to FIG. 6.

At 1210, the method may include transmitting a predictor report indicative of an early decoding termination prediction accuracy associated with decoding the first downlink signal by a decoder of the UE. The operations of block 1210 may be performed in accordance with examples as disclosed herein. In some examples, aspects of the operations of 1210 may be performed by a predictor report transmission manager 630 as described with reference to FIG. 6.

At 1215, the method may include monitoring, in response to transmitting the predictor report, for a second downlink signal from the network entity, the second downlink signal based on the predictor report. The operations of block 1215 may be performed in accordance with examples as disclosed herein. In some examples, aspects of the operations of 1215 may be performed by a downlink signal reception manager 625 as described with reference to FIG. 6.

FIG. 13 shows a flowchart illustrating a method 1300 that supports ETPR in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting a capability report indicating a capability of transmitting the predictor report, where a request for the predictor report is based on the capability report. The operations of block 1305 may be performed in accordance with examples as disclosed herein. In some examples, aspects of the operations of 1305 may be performed by a predictor report transmission manager 630 as described with reference to FIG. 6.

At 1310, the method may include monitoring for a first downlink signal from a network entity. The operations of block 1310 may be performed in accordance with examples as disclosed herein. In some examples, aspects of the operations of 1310 may be performed by a downlink signal reception manager 625 as described with reference to FIG. 6.

At 1315, the method may include transmitting a predictor report indicative of an early decoding termination prediction accuracy associated with decoding the first downlink signal by a decoder of the UE. The operations of block 1315 may be performed in accordance with examples as disclosed herein. In some examples, aspects of the operations of 1315 may be performed by a predictor report transmission manager 630 as described with reference to FIG. 6.

At 1320, the method may include monitoring, in response to transmitting the predictor report, for a second downlink signal from the network entity, the second downlink signal based on the predictor report. The operations of block 1320 may be performed in accordance with examples as disclosed herein. In some examples, aspects of the operations of 1320 may be performed by a downlink signal reception manager 625 as described with reference to FIG. 6.

Figure 14:
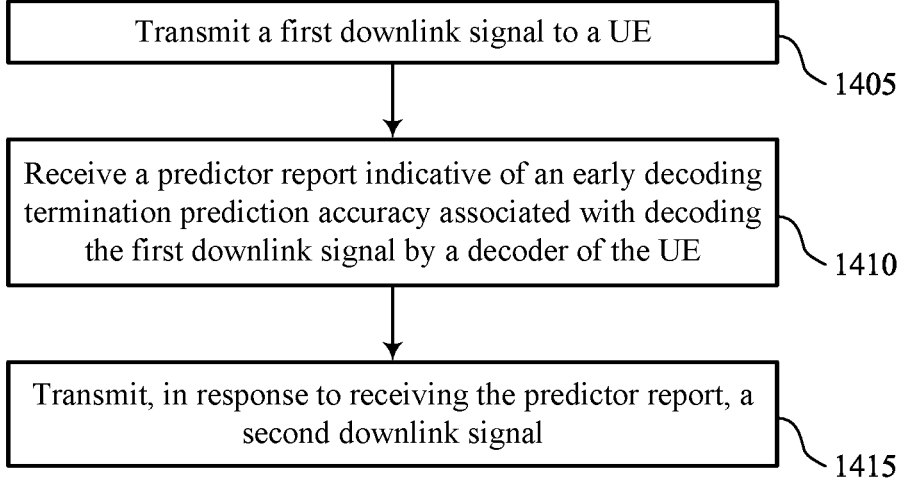

FIG. 14 shows a flowchart illustrating a method 1400 that supports ETPR in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting a first downlink signal to a UE. The operations of block 1405 may be performed in accordance with examples as disclosed herein. In some examples, aspects of the operations of 1405 may be performed by a downlink signal transmission manager 1025 as described with reference to FIG. 10.

At 1410, the method may include receiving a predictor report indicative of an early decoding termination prediction accuracy associated with decoding the first downlink signal by a decoder of the UE. The operations of block 1410 may be performed in accordance with examples as disclosed herein. In some examples, aspects of the operations of 1410 may be performed by a predictor report reception manager 1030 as described with reference to FIG. 10.

At 1415, the method may include transmitting, in response to receiving the predictor report, a second downlink signal. The operations of block 1415 may be performed in accordance with examples as disclosed herein. In some examples, aspects of the operations of 1415 may be performed by a downlink signal transmission manager 1025 as described with reference to FIG. 10.

The following provides an overview of aspects of the present disclosure:

Aspect 1: A method for wireless communications at a UE, comprising: monitoring for a first downlink signal from a network entity; transmitting a predictor report indicative of an early decoding termination prediction accuracy associated with decoding the first downlink signal by a decoder of the UE; and monitoring, in response to transmitting the predictor report, for a second downlink signal from the network entity, the second downlink signal based at least in part on the predictor report.

Aspect 2: The method of aspect 1, further comprising: transmitting a capability report indicating a capability of transmitting the predictor report, wherein a request for the predictor report is based at least in part on the capability report.

Aspect 3: The method of any of aspects 1 through 2, wherein the early decoding termination prediction accuracy is based at least in part on a comparison between a predicted quantity of failed code blocks and actual failed code blocks of the first downlink signal.

Aspect 4: The method of any of aspects 1 through 3, further comprising: receiving a request message indicative of a request for the predictor report, wherein the request message comprises a channel to be estimated for the predictor report, a periodicity for the predictor report, a false alarm threshold associated with transmitting the predictor report, or any combination thereof.

Aspect 5: The method of any of aspects 1 through 4, wherein the second downlink signal is associated with channel parameters that are updated based at least in part on the predictor report.

Aspect 6: The method of any of aspects 1 through 5, further comprising: transmitting, in response to monitoring the second downlink signal, a request to update one or more parameters associated with the early decoding termination prediction accuracy of the decoder of the UE.

Aspect 7: The method of any of aspects 1 through 6, wherein the decoder comprises a low density parity check decoder.

Aspect 8: The method of any of aspects 1 through 7, wherein the decoder comprises a neural network-based predictor.

Aspect 9: The method of any of aspects 1 through 8, wherein the predictor report is based at least in part on the early decoding termination prediction accuracy for a resource block, a scheduling block, a resource block group, a wideband frequency, a bandwidth part, a component carrier, or any combination thereof.

Aspect 10: The method of any of aspects 1 through 9, further comprising: transmitting a channel state feedback report indicative of channel state feedback and a requested configuration associated with a threshold early decoding termination prediction accuracy for the decoder.

Aspect 11: The method of aspect 10, wherein the requested configuration corresponds to a parameter associated with the channel state feedback.

Aspect 12: A method for wireless communications at a network entity, comprising: transmitting a first downlink signal to a UE; receiving a predictor report indicative of an early decoding termination prediction accuracy associated with decoding the first downlink signal by a decoder of the UE; and transmitting, in response to receiving the predictor report, a second downlink signal.

Aspect 13: The method of aspect 12, further comprising: receiving a capability report indicating a capability of the UE to transmit the predictor report, wherein a request for the predictor report is based at least in part on the capability report.

Aspect 14: The method of any of aspects 12 through 13, wherein the early decoding termination prediction accuracy is based at least in part on a comparison between a predicted quantity of failed code blocks and actual failed code blocks of the first downlink signal.

Aspect 15: The method of any of aspects 12 through 14, further comprising: transmitting a request message indicative of a request for the predictor report, wherein the request message comprises a channel to be estimated for the predictor report, a periodicity for the predictor report, a false alarm threshold associated with transmitting the predictor report, or any combination thereof.

Aspect 16: The method of any of aspects 12 through 15, further comprising: updating, based at least in part on the predictor report, channel parameters associated with the second downlink signal.

Aspect 17: The method of any of aspects 12 through 16, further comprising: receiving, in response to transmitting the second downlink signal, a request to update one or more parameters associated with the early decoding termination prediction accuracy of the decoder of the UE.

Aspect 18: The method of any of aspects 12 through 17, wherein the predictor report is based at least in part on the early decoding termination prediction accuracy for a resource block, a scheduling block, a resource block group, a wideband frequency, a bandwidth part, a component carrier, or any combination thereof.

Aspect 19: The method of any of aspects 12 through 18, further comprising: receiving a channel state feedback report indicative of channel state feedback and a requested configuration associated with a threshold early decoding termination prediction accuracy for the decoder.

Aspect 20: The method of aspect 19, wherein the requested configuration corresponds to a parameter associated with the channel state feedback.

Aspect 21: A UE for wireless communications, comprising one or more memories storing processor-executable code, and one or more processors coupled with the one or more memories and individually or collectively operable to execute the code to cause the UE to perform a method of any of aspects 1 through 11.

Aspect 22: A UE for wireless communications, comprising at least one means for performing a method of any of aspects 1 through 11.

Aspect 23: A non-transitory computer-readable medium storing code for wireless communications, the code comprising instructions executable by one or more processors to perform a method of any of aspects 1 through 11.

Aspect 24: A network entity for wireless communications, comprising one or more memories storing processor-executable code, and one or more processors coupled with the one or more memories and individually or collectively operable to execute the code to cause the network entity to perform a method of any of aspects 12 through 20.

Aspect 25: A network entity for wireless communications, comprising at least one means for performing a method of any of aspects 12 through 20.

Aspect 26: A non-transitory computer-readable medium storing code for wireless communications, the code comprising instructions executable by one or more processors to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
      monitor for a first downlink signal from a network entity;
      transmit a predictor report indicative of an early decoding termination prediction accuracy associated with decoding the first downlink signal by a decoder of the UE; and
      monitor, in response to transmitting the predictor report, for a second downlink signal from the network entity, the second downlink signal based at least in part on the predictor report.

2. The UE of claim 1, wherein the one or more processors are individually or collectively further operable to execute the code to cause the UE to:
   transmit a capability report indicating a capability of transmitting the predictor report, wherein a request for the predictor report is based at least in part on the capability report.

3. The UE of claim 1, wherein the early decoding termination prediction accuracy is based at least in part on a comparison between a predicted quantity of failed code blocks and actual failed code blocks of the first downlink signal.

4. The UE of claim 1, wherein the one or more processors are individually or collectively further operable to execute the code to cause the UE to:
   receive a request message indicative of a request for the predictor report, wherein the request message comprises a channel to be estimated for the predictor report, a periodicity for the predictor report, a false alarm threshold associated with transmitting the predictor report, or any combination thereof.

5. The UE of claim 1, wherein the second downlink signal is associated with channel parameters that are updated based at least in part on the predictor report.

6. The UE of claim 1, wherein the one or more processors are individually or collectively further operable to execute the code to cause the UE to:

transmit, in response to monitoring the second downlink signal, a request to update one or more parameters associated with the early decoding termination prediction accuracy of the decoder of the UE.

7. The UE of claim 1, wherein the decoder comprises a low density parity check decoder.

8. The UE of claim 1, wherein the decoder comprises a neural network-based predictor.

9. The UE of claim 1, wherein the predictor report is based at least in part on the early decoding termination prediction accuracy for a resource block, a scheduling block, a resource block group, a wideband frequency, a bandwidth part, a component carrier, or any combination thereof.

10. The UE of claim 1, wherein the one or more processors are individually or collectively further operable to execute the code to cause the UE to:

transmit a channel state feedback report indicative of channel state feedback and a requested configuration associated with a threshold early decoding termination prediction accuracy for the decoder.

11. The UE of claim 10, wherein the requested configuration corresponds to a parameter associated with the channel state feedback.

12. A network entity, comprising:

one or more memories storing processor-executable code; and one or more processors coupled with the one or more memories and individually or collectively operable to execute the code to cause the network entity to:

transmit a first downlink signal to a user equipment (UE);

receive a predictor report indicative of an early decoding termination prediction accuracy associated with decoding the first downlink signal by a decoder of the UE; and transmit, in response to receiving the predictor report, a second downlink signal.

13. The network entity of claim 12, wherein the one or more processors are individually or collectively further operable to execute the code to cause the network entity to:

receive a capability report indicating a capability of the UE to transmit the predictor report, wherein a request for the predictor report is based at least in part on the capability report.

14. The network entity of claim 12, wherein the early decoding termination prediction accuracy is based at least in part on a comparison between a predicted quantity of failed code blocks and actual failed code blocks of the first downlink signal.

15. The network entity of claim 12, wherein the one or more processors are individually or collectively further operable to execute the code to cause the network entity to:

transmit a request message indicative of a request for the predictor report, wherein the request message comprises a channel to be estimated for the predictor report, a periodicity for the predictor report, a false alarm threshold associated with transmitting the predictor report, or any combination thereof.

16. The network entity of claim 12, wherein the one or more processors are individually or collectively further operable to execute the code to cause the network entity to:

update, based at least in part on the predictor report, channel parameters associated with the second downlink signal.

17. The network entity of claim 12, wherein the one or more processors are individually or collectively further operable to execute the code to cause the network entity to:

receive, in response to transmitting the second downlink signal, a request to update one or more parameters associated with the early decoding termination prediction accuracy of the decoder of the UE.

18. The network entity of claim 12, wherein the predictor report is based at least in part on the early decoding termination prediction accuracy for a resource block, a scheduling block, a resource block group, a wideband frequency, a bandwidth part, a component carrier, or any combination thereof.

19. The network entity of claim 12, wherein the one or more processors are individually or collectively further operable to execute the code to cause the network entity to:

receive a channel state feedback report indicative of channel state feedback and a requested configuration associated with a threshold early decoding termination prediction accuracy for the decoder.

20. The network entity of claim 19, wherein the requested configuration corresponds to a parameter associated with the channel state feedback.

21. A method for wireless communications at a user equipment (UE), comprising:

monitoring for a first downlink signal from a network entity;

transmitting a predictor report indicative of an early decoding termination prediction accuracy associated with decoding the first downlink signal by a decoder of the UE; and monitoring, in response to transmitting the predictor report, for a second downlink signal from the network entity, the second downlink signal based at least in part on the predictor report.

22. The method of claim 21, further comprising:

transmitting a capability report indicating a capability of transmitting the predictor report, wherein a request for the predictor report is based at least in part on the capability report.

23. The method of claim 21, wherein the early decoding termination prediction accuracy is based at least in part on a comparison between a predicted quantity of failed code blocks and actual failed code blocks of the first downlink signal.

24. The method of claim 21, further comprising:

receiving a request message indicative of a request for the predictor report, wherein the request message comprises a channel to be estimated for the predictor report, a periodicity for the predictor report, a false alarm threshold associated with transmitting the predictor report, or any combination thereof.

25. The method of claim 21, wherein the second downlink signal is associated with channel parameters that are updated based at least in part on the predictor report.

26. A method for wireless communications at a network entity, comprising:

transmitting a first downlink signal to a user equipment (UE);

receiving a predictor report indicative of an early decoding termination prediction accuracy associated with decoding the first downlink signal by a decoder of the UE; and transmitting, in response to receiving the predictor report, a second downlink signal.

27. The method of claim 26, further comprising:

receiving, in response to transmitting the second down-link signal, a request to update one or more parameters associated with the early decoding termination prediction accuracy of the decoder of the UE.

28. The method of claim 26, wherein the predictor report is based at least in part on the early decoding termination prediction accuracy for a resource block, a scheduling block, a resource block group, a wideband frequency, a bandwidth part, a component carrier, or any combination thereof.

29. The method of claim 26, further comprising:

receiving a channel state feedback report indicative of channel state feedback and a requested configuration associated with a threshold early decoding termination prediction accuracy for the decoder.

30. The method of claim 29, wherein the requested configuration corresponds to a parameter associated with the channel state feedback.

\* \* \* \* \*